United States Patent Office 2,938,910
Patented May 31, 1960

2,938,910

3-(DILOWERALKANOYL)METHYLPHTHALIDES

Donald D. Wheeler and David C. Young, Midland, Mich., assignors to The Dow Chemical Company, Midland, Mich., a corporation of Delaware No Drawing. Filed Sept. 19, 1956, Ser. No. 610,870

4 Claims. (Cl. 260—343.3)

This invention is concerned with phthalides having the formula

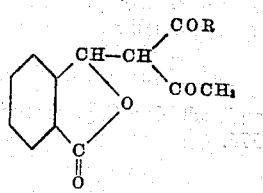

In this and succeeding formulae R represents an alkyl group containing from 1 to 4 carbon atoms, inclusive. These compounds are light colored solids or oils somewhat soluble in many organic solvents such as benzene, toluene and acetone and difficulty soluble in water. The compounds have utility as parasiticides and are adapted to be employed as toxic constituents in bactericidal, fungidal and insecticidal compositions.

The new compounds may be prepared by causing phthalaldehydic acid to react with an appropriate diketone having the formula

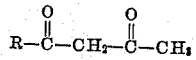

to produce the desired phthalide and water of reaction. The terms "phthalaldehydic acid" and "3-hydroxyphthalide" refer to a compound having the structure

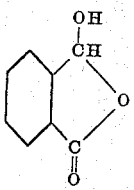

Phthalaldehydic acid is often represented in the literature as having the structure

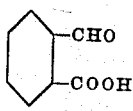

However, the acid employed in this invention and prepared as hereinafter described exists almost entirely in the 3-hydroxyphthalide form as observed from a study of its infrared absorption spectrum. Infrared data also indicate the products of the present invention to exist in the phthalide form.

In the synthesis good results are obtained when substantially equimolar proportions of the reactants are employed. The reaction takes place smoothly in the temperature range of from 90° to 130° C. Solvents such as benzene and toluene may be employed as reaction medium, if desired.

In carrying out the reaction, phthalaldehydic acid and the appropriate diketone are mixed together and heated from 0.5 to 4 hours. After completion of the heating, the mixture is cooled somewhat and poured into water to precipitate the desired product. The resulting mixture is then cooled to from 15° to 25° C. If the product is a solid, it is separated from the mixture by filtration and purified by conventional means. If the product is a liquid, it is extracted from the mixture with benzene and the benzene extract heated to distill the benzene and recover the desired phthalide product as residue.

The following examples illustrate the invention but are not to be construed as limiting.

*Example 1.—3-Diacetylmethylphthalide*

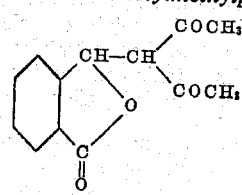

50 grams (0.5 mole) of 2,4-pentanedione and 75 grams (0.5 mole) of phthalaldehydic acid are mixed together and heated at 100° C. under reflux for 3 hours. After completion of the heating, the mixture is cooled to 90° C. and poured into 600 milliliters of water to precipitate the desired product as an oil. The mixture is cooled whereupon the oil crystallizes. The crystalline solid is collected by filtration and dried at about 60° C. to obtain a 3-diacetylmethylphthalide product. The product melts at 97°–98° C. The yield of the product is 90 grams or 78 percent of theoretical.

*Example 2.—3-(1-acetyl-1-propionyl)methylphthalide*

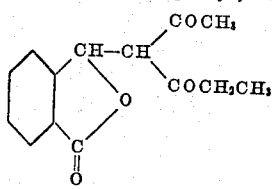

57 grams (0.5 mole) of 2,4-hexanedione and 75 grams (0.5 mole) of phthalaldehydic acid are mixed together and heated at 110° C. under reflux for 3 hours. After completion of the heating, the mixture is cooled to about 80° C. and poured into 500 milliliters of water to precipitate an oil. The resulting mixture is cooled in an ice bath to convert the oil to a solid product. The latter is filtered from the mixture and dried to obtain a 3-(1-acetyl-1-propionyl)methylphthalide product having a molecular weight of 245.

*Example 3.—3-(1-acetyl-1-butyryl)methylphthalide*

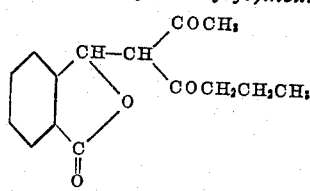

64 grams (0.5 mole) of 2,4-heptanedione and 75 grams (0.5 mole) of phthalaldehydic acid are mixed together and heated under reflux for 2 hours. After completion of the heating, the mixture is cooled to about 90° C. and poured into 500 milliliters of water to precipitate the desired product as an oil. The resulting mixture is extracted with benzene and the benzene extract heated to distill the solvent and to obtain as residue a 3-(1-acetyl-1-butyryl)methylphthalide product having a molecular weight of 260.

In a similar manner the following phthalides are prepared:

3-(1-acetyl-1-isobutyryl)methylphthalide having a molecular weight of 260 by the reaction of phthalaldehydic acid with 5-methyl 2,4-hexanedione.

3-(1-acetyl-1-(3-methyl)butyryl)methylphthalide having a molecular weight of 274 by the reaction of phthalaldehydic acid with 6-methyl-2,4-heptanedione.

The products of this invention are useful as parasiticides. They are particularly valuable for the control of bacterial and fungal organisms. In a representative operation, 3-(diacetylmethyl)phthalide was added to bacteriological media to give a concentration of 0.05 percent and the media inoculated with *Staphylococcus aureus* and *Rhizopus nigricans* and incubated at 30° C. for 4 days. At the end of this period, complete inhibition of growth of the organisms was observed.

The products are also useful as insecticides. In a representative operation, substantially complete controls were obtained when cockroaches (*Periplaneta americana*) were contacted with a toxic composition containing 0.24 gram of 3-diacetylmethyl(phthalide) in 100 milliliters of aqueous dispersion.

The phthalaldehydic acid employed in this invention may be prepared by first photochlorinating o-xylene to obtain α,α,α,α′,α′-pentachloro-o-xylene by passing chlorine gas into o-xylene while illuminating with sunlamps. The resulting chlorinated o-xylene is then heated with an aqueous hydrochloric acid solution to obtain phthalaldehydic acid as more fully disclosed in U.S. Patent 2,748,162.

The diketones employed in this invention may be prepared by acylating acetone with an appropriate acid anhydride in the presence of a basic or boron trifluoride catalyst.

We claim:
1. A phthalide having the formula

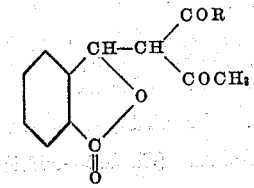

wherein R represents an alkyl group containing from 1 to 4 carbon atoms, inclusive.
2. 3-(1-acetyl-1-propionyl)methylphthalide.
3. 3-(1-acetyl-1-butyryl)methylphthalide.
4. 3-diacetylmethylphthalide.

References Cited in the file of this patent

Beilsteins Handbuch der Org. Chemie, vol. 17, pp. 571, 574 and 576.